US009651967B2

(12) United States Patent
De Haas

(10) Patent No.: US 9,651,967 B2
(45) Date of Patent: May 16, 2017

(54) POWER SUPPLY WITH INTEGRATED VOLTAGE CLAMP AND CURRENT SINK

(75) Inventor: Clemens Gerhardus Johannes De Haas, Ewijk (NL)

(73) Assignee: NXP B.V., Eindhoven (NL)

( * ) Notice: Subject to any disclaimer, the term of this patent is extended or adjusted under 35 U.S.C. 154(b) by 243 days.

(21) Appl. No.: 13/292,214

(22) Filed: Nov. 9, 2011

(65) Prior Publication Data

US 2013/0113446 A1 May 9, 2013

(51) Int. Cl.

| | |
|---|---|
| ***G05F 1/565*** | (2006.01) |
| ***G05F 1/569*** | (2006.01) |
| ***G05F 1/571*** | (2006.01) |
| ***H02H 3/20*** | (2006.01) |
| ***H02H 9/04*** | (2006.01) |
| ***G05F 1/613*** | (2006.01) |
| ***G05F 1/618*** | (2006.01) |

(52) U.S. Cl.
CPC .............. *G05F 1/613* (2013.01); *G05F 1/571* (2013.01); *G05F 1/618* (2013.01)

(58) Field of Classification Search
CPC .. H02H 3/20; H02H 3/24; G05F 1/565; G05F 1/569; G05F 1/571
USPC ........... 323/273–277, 282, 284, 285; 361/88, 361/91.1, 91.7
See application file for complete search history.

(56) References Cited

U.S. PATENT DOCUMENTS 6,201,375 B1 3/2001 Larson et al.
6,707,280 B1 3/2004 Liu et al.
7,830,128 B2 * 11/2010 Xu ........................ H02M 3/156 323/224
2002/0125872 A1 * 9/2002 Groom .................. H02M 3/156 323/288
2004/0114291 A1 * 6/2004 Ilg .......................... H02H 9/047 361/91.1
2006/0158165 A1 * 7/2006 Inn .......................... G05F 1/575 323/280
2006/0186867 A1 * 8/2006 Kataoka ................ H02M 3/158 323/282
2007/0075692 A1 4/2007 Ostrom et al.
2008/0012542 A1 * 1/2008 Liu ......................... H02M 1/32 323/271
2010/0156362 A1 * 6/2010 Xle ......................... G05F 1/565 323/273
2010/0213910 A1 * 8/2010 Chen .................. H02M 3/1588 323/282

(Continued)

FOREIGN PATENT DOCUMENTS

WO 2009044326 A1 4/2009

OTHER PUBLICATIONS

Partial Extended European Search Report for Patent Appln. No. 12181522.9 (Jul. 8, 2016).

*Primary Examiner* — Adolf Berhane
*Assistant Examiner* — Gary Nash
(74) *Attorney, Agent, or Firm* — Rajeev Madnawat

(57) ABSTRACT

Various exemplary embodiments relate a system and method for supplying power. The system may include an input/output port, a regulator, and a clamp. The regulator may supply power to the input/output port in a first mode, sink current from the input/output port in a second mode, and be disabled in a third mode. The clamp may be disabled in the first and second modes, and may limit the voltage at the input/output port below a first value in the third mode.

19 Claims, 6 Drawing Sheets

(56) References Cited

U.S. PATENT DOCUMENTS

2010/0231190 A1 * 9/2010 Falvey .................. H02M 3/158
323/284

* cited by examiner

POWER SUPPLY WITH INTEGRATED VOLTAGE CLAMP AND CURRENT SINK

TECHNICAL FIELD

Various exemplary embodiments disclosed herein relate generally to circuitry for clamping voltage and sinking current.

BACKGROUND

A voltage clamp may be used to adapt an input voltage signal to a component that cannot make use of or may be damaged by the voltage range of the original voltage input. A current sink is an electrical component or circuit that may drain current from other components.

SUMMARY

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a system for supplying power, including: an input/output port; a regulator, wherein the regulator supplies power to the input/output port in a first mode, sinks current from the input/output port in a second mode, and is disabled in a third mode; and a clamp, wherein the clamp is disabled in the first and second modes, and limits the voltage at the input/output port below a first value in the third mode.

In some embodiments, the regulator limits the voltage at the input/output port to below the first value in the second mode. In some embodiments, the regulator is a push/pull low-dropout regulator. In some embodiments, the regulator includes a source regulator and a sink regulator. In some embodiments, the sink regulator is enabled when the voltage at the input/output port exceeds a threshold. In some embodiments, the first value is a voltage that would damage the system. In some embodiments, the regulator and the clamp are integrated in the same component. In some embodiments, the regulator supplies power to a microcontroller. In some embodiments, the microcontroller receives inputs from external switches. In some embodiments, the regulator limits a voltage from the external switches in the second mode, and wherein the clamp limits the voltage from the external switches in the third mode.

Various exemplary embodiments further relate to a method for supplying power, including: supplying power to an input/output port by a regulator in a first mode; sinking current from the input/output port by the regulator in a second mode; disabling the regulator in a third mode; and limiting the voltage at the input/output port below a first value by a clamp in the third mode.

In some embodiments, sinking current from the input/output port by the regulator includes limiting the voltage at the input/output port to below the first value in the second mode. In some embodiments, the regulator is a push/pull low-dropout regulator. In some embodiments, the regulator includes a source regulator and a sink regulator. In some embodiments, the method for supplying power further includes enabling the sink regulator when the voltage at the input/output port exceeds a threshold. In some embodiments, the regulator and the clamp are integrated in the same component. In some embodiments, the method for supplying power further includes supplying power to a microcontroller by the regulator. In some embodiments, the microcontroller receives inputs from external switches. In some embodiments, the method for supplying power further includes: limiting a voltage from the external switches by the regulator in the second mode; and limiting the voltage from the external switches by the clamp in the third mode.

BRIEF DESCRIPTION OF THE DRAWINGS

In order to better understand various exemplary embodiments, reference is made to the accompanying drawings, wherein.

DETAILED DESCRIPTION

Figure 1:
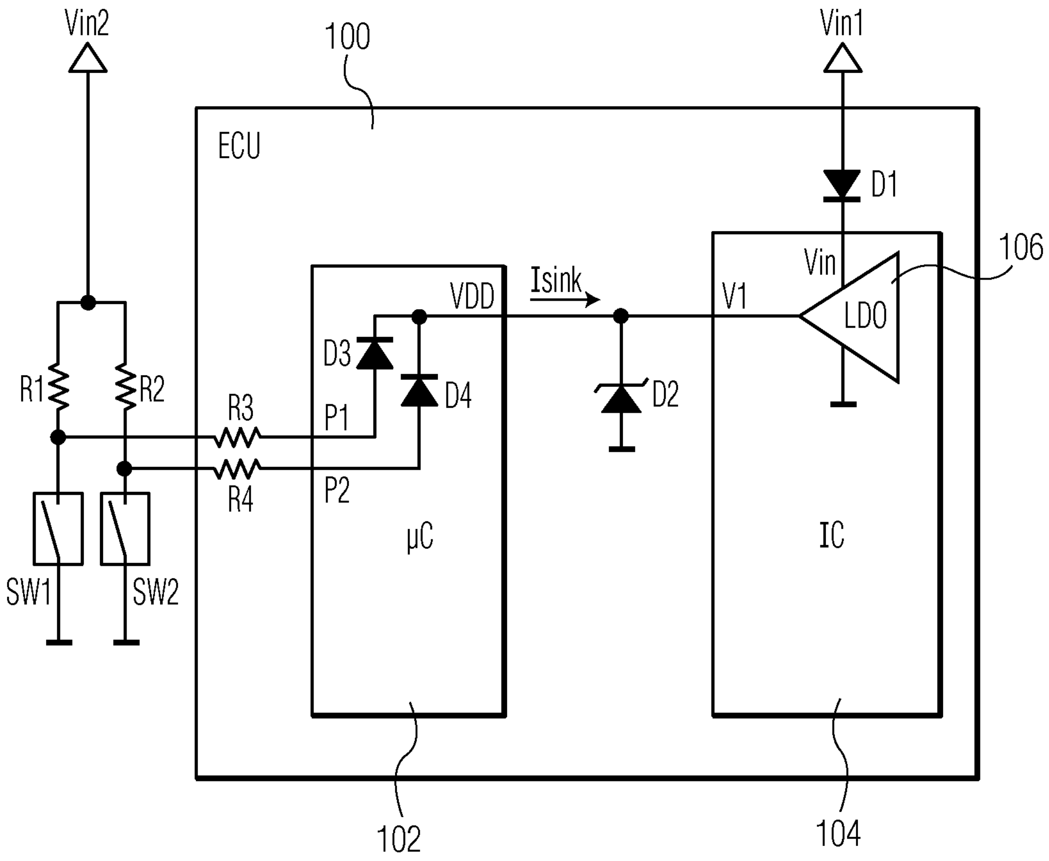
FIG. 1 Prior Art
FIG. 1 illustrates an embodiment of a conventional electronic control unit.

Referring now to the drawings, in which like numerals refer to like components or steps, there are disclosed broad aspects of various exemplary embodiments.

It should be appreciated by those skilled in the art that any block diagrams herein represent conceptual views of illustrative circuitry embodying the principals of the embodiments of the invention.

According to the foregoing, various exemplary embodiments provide for a system and method for supplying power.

FIG. 1 illustrates an embodiment of a conventional electronic control unit (ECU) 100. The ECU 100 may include a microcontroller (μC) 102 and an integrated circuit (IC) 104. The ECU 100, μC 102, and IC 104 may be provided as integrated components or as separate components. The IC 104 may receive an input voltage Vin1 from a direct current voltage source, such as, for example, a 12V vehicle battery. A diode D1 may aid in decoupling the IC 104 from the power source. The IC 104 may include a low-dropout regulator (LDO) 106. The LDO 106 may regulate the input voltage Vin1 and may output a constant voltage from an input/output port V1 for powering the μC 102. The voltage for powering the μC 102 may be input at the Vdd port of the μC 102. A zener diode D2 may be connected between ground and the V1 and Vdd ports of the IC 104 and μC 102. Input ports (P1, P2) of the μC 102 may be connected to one or more switches (SW1, SW2). The input ports may detect if one or more of the switches (SW1, SW2) is open or closed. The switches SW1 and SW2 may be switches within an automotive vehicle. While two switches are illustrated in FIG. 1, more switches may be connected depending on the capabilities of the μC 102. Pull-up resistors R1 and R2 may cause the voltage applied to the input ports P1 and P2 to be proportional to an input voltage Vin2 when the corresponding switch (SW1, SW2) is open. The input voltage Vin2 may be supplied by a direct current voltage source, such as, for example a 12V vehicle battery. The input voltages Vin1 and Vin2 may be supplied by the same voltage source or different voltages sources. Resistors R3 and R4 may limit the current flowing in ECU 100. Diodes D3 and D4 may protect the μC 102 from electrostatic discharge (ESD).

The voltage supplied by Vin2 to the input ports P1 and P2 of the μC 102 may be a large voltage that may damage the μC 102. For example, the voltage supplied by a 12V vehicle battery may have a voltage supply range of up to 40V. The zener diode D2 may protect the μC 102 when a large voltage is supplied to one or more of the input ports P1 and P2. The input ports P1 and P2 may be connected to the zener diode D2 via the ESD diodes D3 and D4. The zener diode D1, and ESD diodes D3 and D4 may form a clamp that may limit the voltage on the input ports P1 and P2. The current (Isink) flowing into the zener diode D2 may be limited by the resistors R3 and R4. The zener voltage of the zener diode D2 may be chosen to be higher than the maximum output voltage of the LDO 106. For example, if the maximum output voltage of the LDO 106 is 5.5V, then the zener voltage may be chosen to be 7V to account for voltage spread and the maximum Isink current. The IC 104 in a conventional ECU 100 may be designed to passively withstand the voltage at the V1 port. The voltage that the IC 104 may withstand may be dependent on the manufacturing process of the IC. For example, an ABCD3 manufacturing process may include 5V CMOS components. An IC manufactured with the ABCD3 process may be able to passively withstand a voltage of 7V.

However, in some embodiments, the IC 104 may not be capable of withstanding certain voltages at the V1 port, and the IC 104 may fail or be damaged when one or more switches (SW1, SW2) is open. For example, an IC manufactured using the ABCD9 process may include CMOS14 based components with a breakdown voltage of 3.6V. An IC manufactured using the ABCD9 process may have a maximum voltage of 6V and may be damaged at 7V. Therefore, it may be desirable to limit the voltage at the V1 port to below the maximum voltage of the IC.

Alternatively, the use of an external zener diode D2 may not be desirable to a system designer due to cost and component size considerations. Therefore, it may be desirable for the clamping function of the external zener diode D2 to be incorporated into an IC.

Figure 2:
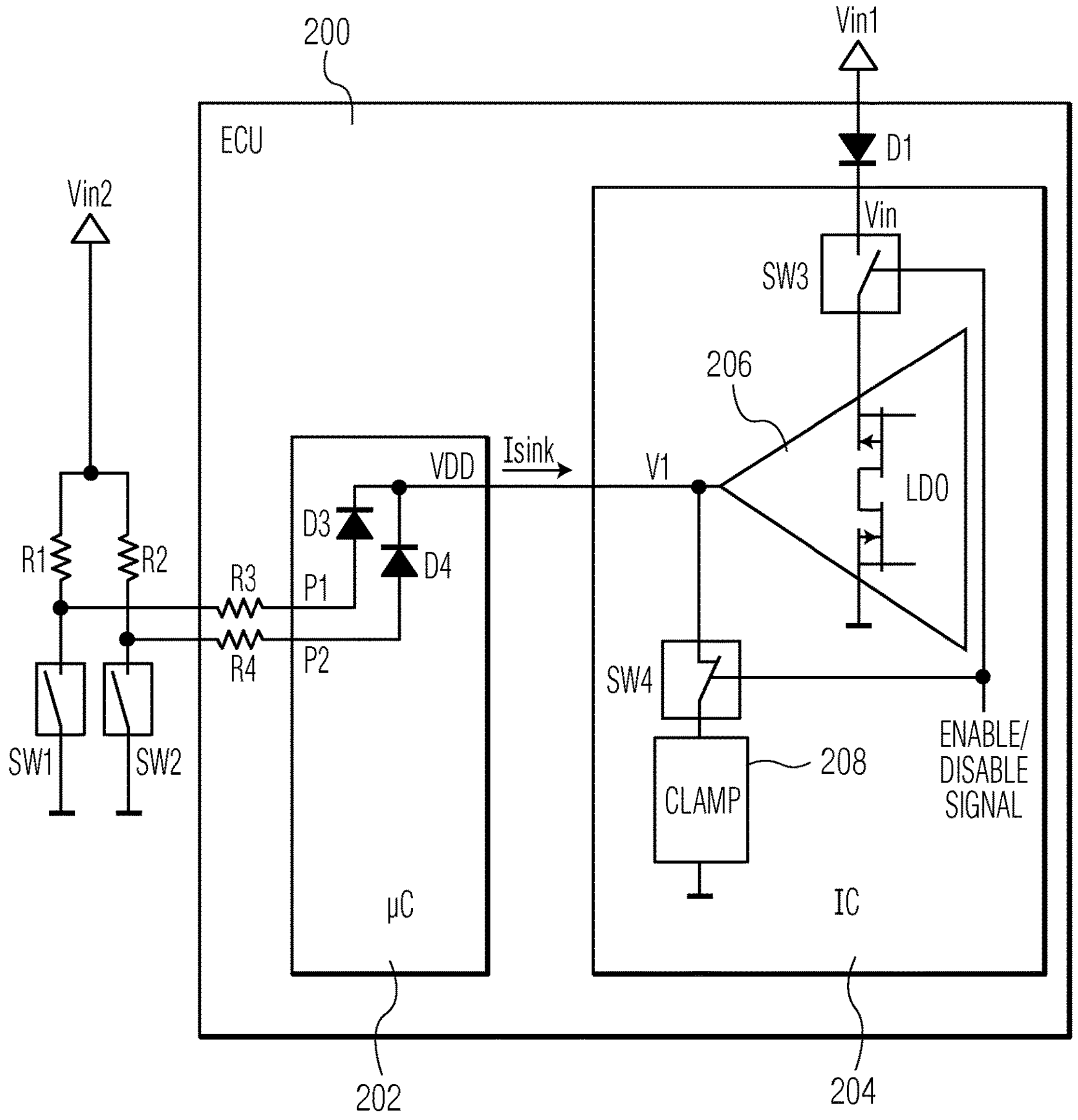
FIG. 2 illustrates an electronic control unit according to an embodiment of the present invention.

FIG. 2 illustrates an electronic control unit (ECU) 200 according to an embodiment of the present invention. The ECU 200 may include a microcontroller (μC) 202 and an integrated circuit (IC) 204. The ECU 200, μC 202, and IC 204 may be provided as integrated components or as separate components. The IC 204 may receive an input voltage Vin1 from a direct current voltage source, such as, for example, a 12V vehicle battery. A diode D1 may aid in decoupling the IC 204 from the power source. The IC 204 may include a push/pull low-dropout regulator (LDO) 206. The push/pull LDO 206 may regulate the input voltage Vin1 and may output a constant voltage from an input/output port V1 for powering the μC 202. The voltage for powering the μC 202 may be input at the Vdd port of the μC 202. The IC 204 may further include an internal clamp 208. The internal clamp 208 may be connected to the V1 port of the IC 204. The IC 204 may further include switches SW3 and SW4 for enabling/disabling the push/pull LDO 206 and the internal clamp 208. The switches SW3 and SW4 may be activated by an enable/disable signal. The enable/disable signal may be supplied by digital logic circuitry (not shown) in the IC 202.

Input ports (P1, P2) of the μC 202 may be connected to one or more switches (SW1, SW2). The input ports may detect if one or more of the switches (SW1, SW2) is open or closed. The switches SW1 and SW2 may be switches within an automotive vehicle. While two switches are illustrated in FIG. 2, more switches may be connected depending on the capabilities of the μC 202. Pull-up resistors R1 and R2 may cause the voltage applied to the input ports P1 and P2 to be proportional to an input voltage Vin2 when the corresponding switch (SW1, SW2) is open. The input voltage Vin2 may be supplied by a direct current voltage source, such as, for example a 12V vehicle battery. The input voltages Vin1 and Vin2 may be supplied by the same voltage source or different voltages sources. Resistors R3 and R4 may limit the current flowing in ECU 200. Diodes D3 and D4 may protect the μC 102 from electrostatic discharge (ESD).

The voltage supplied by Vin2 to the input ports P1 and P2 of the μC 202 may be a large voltage that may damage the μC 202. For example, the voltage supplied by a 12V vehicle battery may have a voltage supply range of up to 40V. The circuitry in the IC 204 may protect the μC 202 when a large voltage is supplied to one or more of the input ports P1 and P2. The input ports P1 and P2 may be connected to the V1 port of the IC 204 via the ESD diodes D3 and D4. The current (Isink) flowing into the IC 204 may be limited by the resistors R3 and R4.

The clamp 208 may be enabled when the push/pull LDO 206 is disabled or when the IC 204 is not receiving an input voltage Vin1. The clamp 208 may be disabled when the push/pull LDO 206 is enabled. The clamp 208 may function when a voltage is present at only the V1 port of the IC 204. The clamp 208 may protect the μC 202 when the push/pull LDO 206 is disabled (for example, when the voltage from Vin1 is very low or unavailable). The push/pull LDO 206 may protect the μC 202 when the clamp is disabled. When the clamp 208 is enabled, the voltage at the V1 port may be clamped to between 0V and a voltage below the maximum voltage the IC 204 can withstand (Vmax). When the push/pull LDO 206 is enabled, the voltage at the V1 port may be held within a minimum and maximum range (Vmin and Vmax).

The push/pull LDO 206 may be capable of both sourcing current and sinking current. When the push/pull LDO 206 is enabled and the clamp 208 is disabled, the push/pull LDO 206 may sink excess current from the V1 port of the IC 206. The push/pull LDO 206 may be designed to sink the maximum reverse current allowed by the μC 202.

Figure 3:
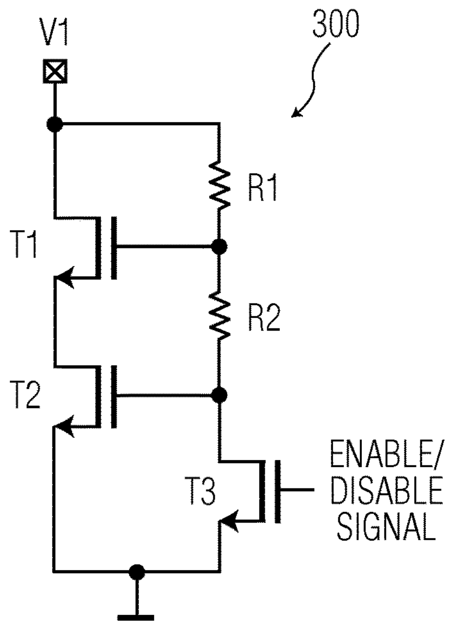
FIG. 3 illustrates an embodiment of a clamp.

FIG. 3 illustrates an embodiment of a clamp circuit 300. The clamp circuit 300 may include a cascode of low-voltage NMOS transistors T1 and T2. Transistor T3 may enable/disable the clamp circuit 300. When transistor T3 is open (enable/disable signal=LOW), the output voltage at the V1 port may be the Vgs voltage of transistor T2. Depending on the size of transistor T2 and the drain current, the voltage at the V1 port may be much lower than Vmax. When the clamp is disabled (enable/disable signal=HIGH), the current consumption of the clamp circuit 300 may be limited by resistors R1 and R2. Resistors R1 and R2 may have a large value to limit the current consumption to an acceptable level. While NMOS transistors are shown in FIG. 3, other types of clamping technology may be used for the clamp 208 illustrated in FIG. 2.

Figure 4A:
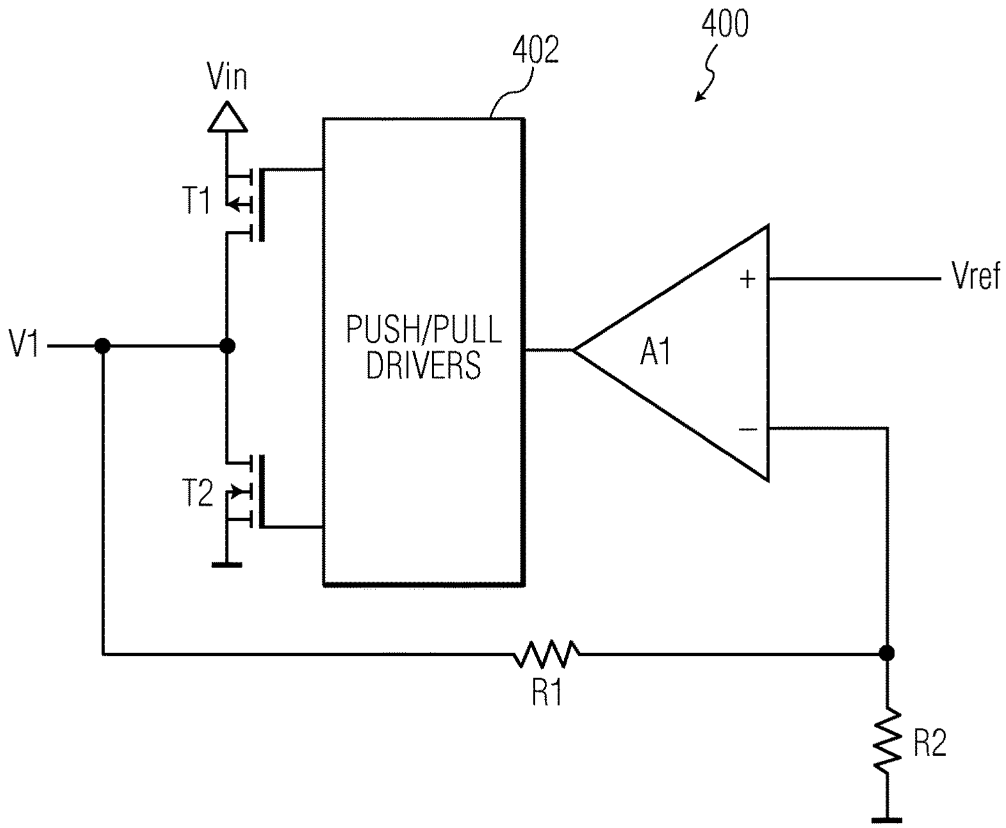
FIG. 4*a* illustrates an embodiment of a push/pull LDO regulator.

FIG. 4*a* illustrates an embodiment of a push/pull LDO 400. The push/pull LDO 400 illustrated in FIG. 4*a* may be based on a PMOS transistor T1. The push/pull LDO 400 may include an amplifier A1 and biasing resistors R1 and R2. In order for the push/pull LDO 400 to sink current, the push/pull LDO 400 may further include push/pull drivers 402 and an NMOS transistor T2. The push/pull drivers 402 may drive the transistors T1 and T2 in a class-AB, class-B or class C configuration. The push/pull LDO 400 may be configured so that when current is flowing into the push/pull LDO 400 (through transistor T2), the output voltage at the V1 port is kept below Vmax. However, the additional components for sinking current may increase the quiescent current of the push/pull LDO 400.

Figure 4B:
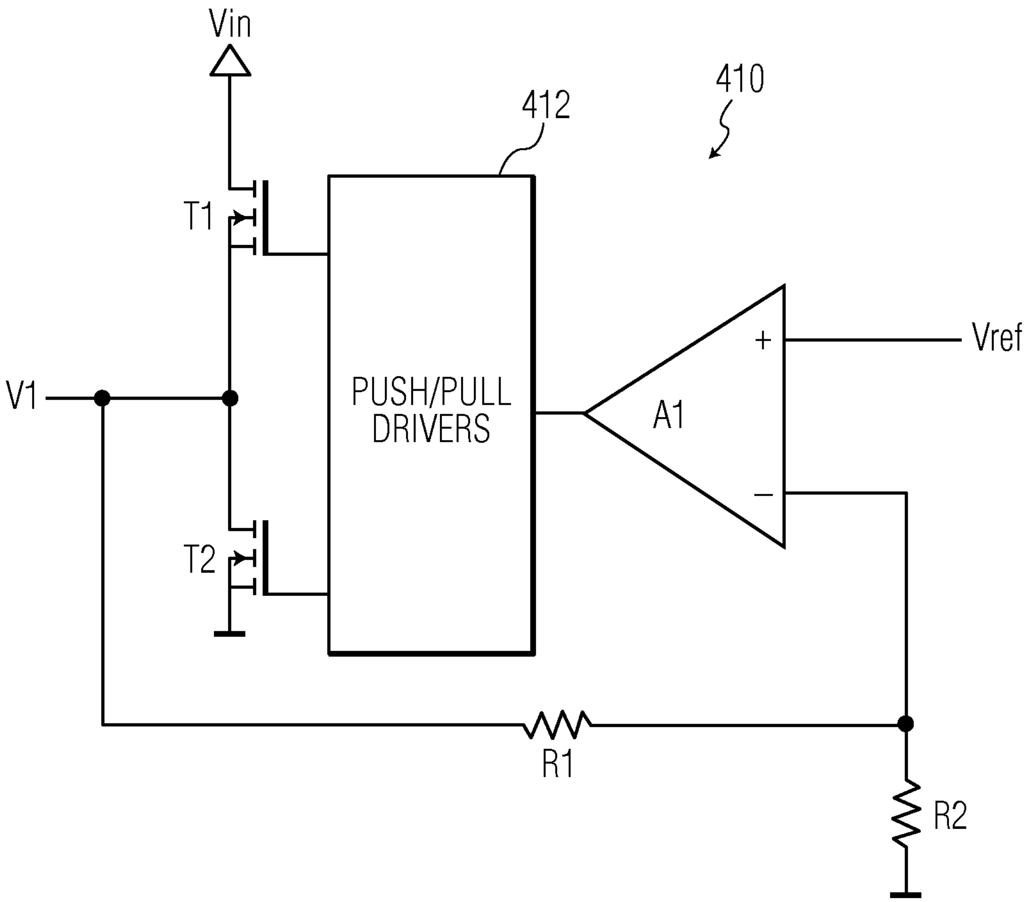
FIG. 4*b* illustrates an alternate embodiment of a push/pull LDO regulator.

FIG. 4*b* illustrates an alternate embodiment of a push/pull LDO 410. The push/pull LDO 410 illustrated in FIG. 4*b* may be based on a NMOS transistor T1. The other components in FIG. 4*b* may operate similarly to the push/pull LDO 400 illustrated in FIG. 4*a*. The push/pull LDO 410 may include an amplifier A1 and biasing resistors R1 and R2. In order for the push/pull LDO 410 to sink current, the push/pull LDO 410 may further include push/pull drivers 412 and an NMOS transistor T2. The push/pull drivers 412 may drive the transistors T1 and T2 in a class-AB, class-B or class C configuration. The push/pull LDO 410 may be configured so that when current is flowing into the push/pull LDO 410 (through transistor T2), the output voltage at the V1 port is kept below Vmax. However, the additional components for sinking current may increase the quiescent current of the push/pull LDO 410.

Figure 5:
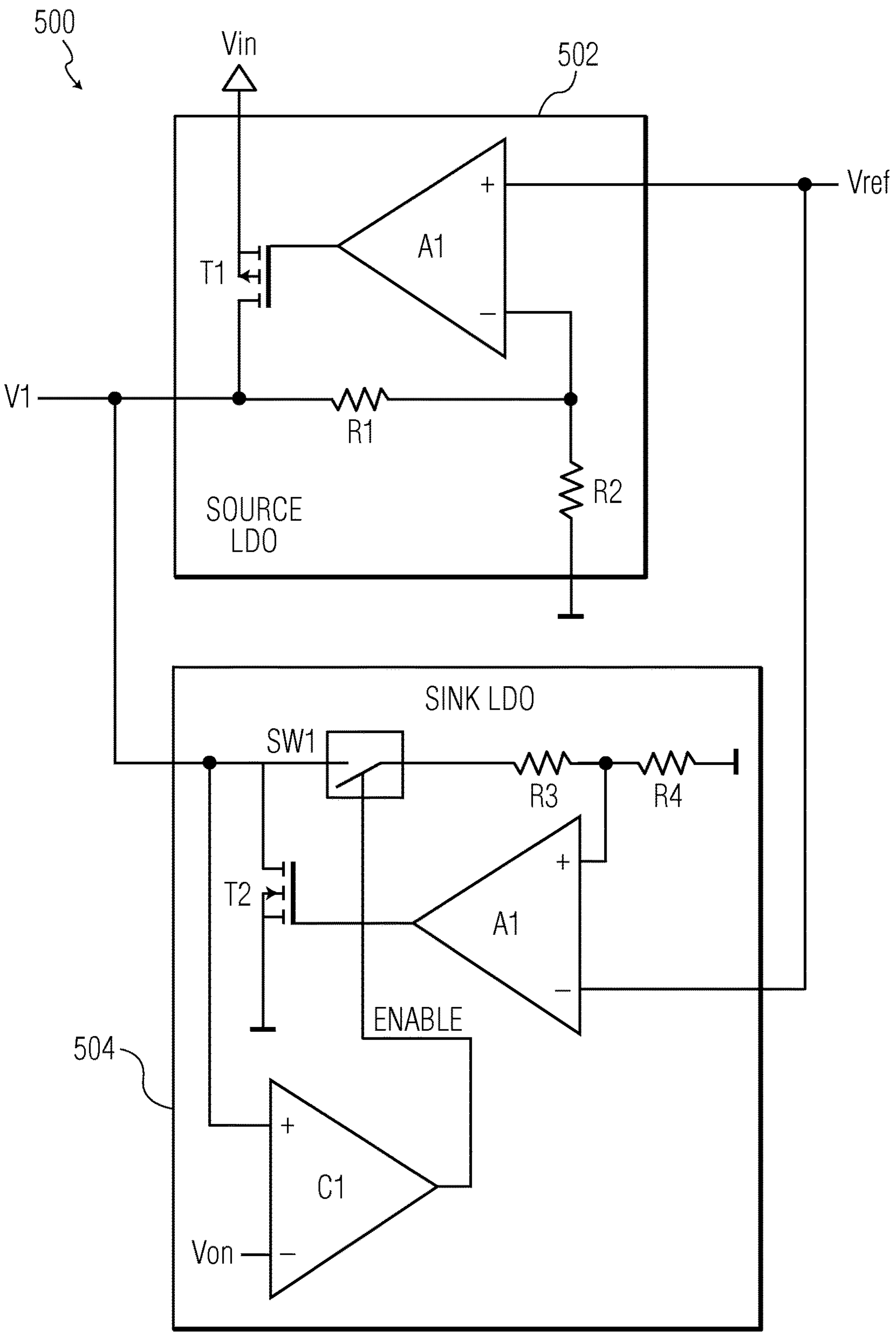
FIG. 5 illustrates an alternate embodiment of a push/pull LDO regulator.
Figure 6:
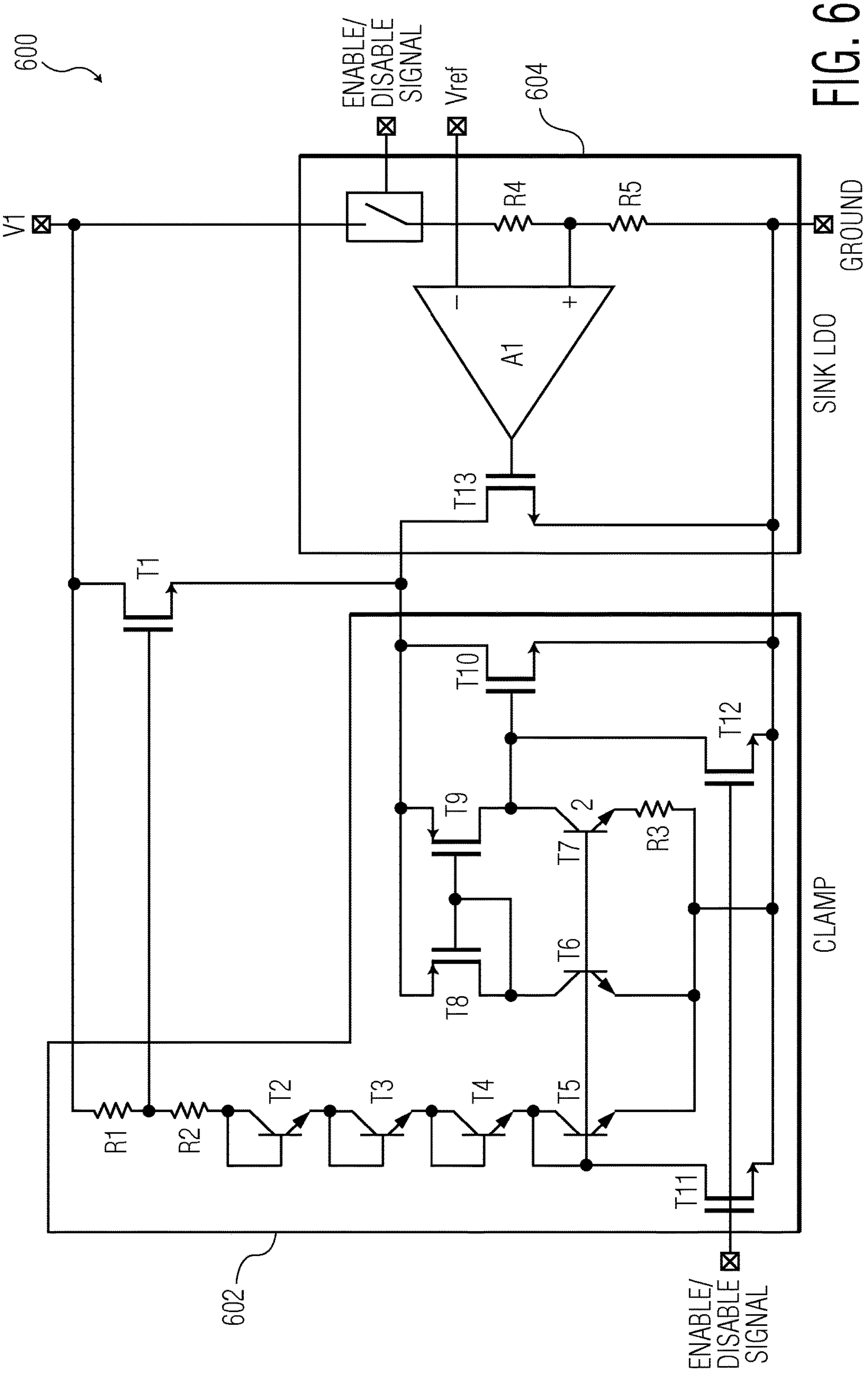
FIG. 6 illustrates an embodiment of a combination circuit.

FIG. 5 illustrates an alternate embodiment of a push/pull LDO 500. The push/pull LDO 500 illustrated in FIG. 5 may include a source LDO 502 and a sink LDO 504. The source LDO 502 may include a PMOS transistor T1, an amplifier A1, and biasing resistors R1 and R2. Alternatively, the transistor T1 may be an NMOS transistor as described in FIG. 4*a*. The sink LDO 504 may be similar to the source LDO 502, but with a NMOS output transistor T2 connected to ground. A comparator C1 may compare the voltage at the V1 port to a threshold voltage Von. The comparator C1 may enable the sink LDO 504 by activating a switch SW1 when the voltage at the V1 port exceeds the threshold Von. When the sink LDO 504 is enabled, an amplifier A2 may drive the transistor T2. The amplifier may be biased by resistors R3 and R4. Because the sink LDO 504 is only enabled when the voltage on the V1 port crosses a certain value (Von), the sink LDO 504 may not need to have a low quiescent current consumption, unlike the circuits illustrated in FIGS. 4*a* and 4*b*.

1 an embodiment of a combination circuit 600 that includes a clamp 602 and sink LDO 604. The combination circuit 600 may further include a high-voltage cascode transistor T1. The clamp 602 may limit the voltage at the V1 port to between a minimum voltage Vmin and a maximum voltage Vmax. The minimum voltage Vmin and maximum voltage Vmax may be determined by the design of the IC 204 and other system components. The clamp 602 may consume a maximum current of Imax when the clamp 602 is disabled. The sink LDO 604 may operate at close to the maximum voltage Vmax of the clamp 602. Both circuits may share the high-voltage cascode transistor T1 because transistor T1 may be relatively large in size compared to the clamp 602 and sink LDO 604 circuits.

The clamp 602 may include transistors T2, T3, T4, T5, T6, T7, T8, T9, T10, T11, and T12, and resistors R1, R2, and R3. The sink LDO 604 may include a transistor T13, an amplifier A1, a switch SW1, and resistors R4 and R5.

Similarly to the system described in FIG. 2, the combination circuit 600 may disable the clamp 602 when the sink LDO 604 is enabled, and enable the clamp 602 when the sink LDO is disabled. The clamp 602 may be enabled and the sink LDO disabled by a LOW enable/disable signal. When the clamp 602 is enabled and the sink LDO 604 is disabled, the circuitry in the clamp 602 may function on a feedback loop which may regulate a voltage to approximately four times a bandgap voltage. The clamp 602 may be regulated to the condition that the current in transistor T9 equals the current in transistor T7 by driving the transistor T10 such that the current in transistors T1 and T10 equals the current at the V1 port. The following equations may be used to calculate values in the combination circuit 600 when the clamp is enabled:

$$I_{T9} = I_{T7} = I_{T8} = I_{T6}$$

$$I_{T6} = \frac{V_T \ln 2}{R3}$$

$$V_{V1} = 4V_{BE} + \frac{R1 + R2}{R3} V_T \ln 2 = 4\left(V_{BE} + \frac{R1 + R2}{4R3} V_T \ln 2\right)$$

The output voltage at the V1 port may be regulated to 4 times a bandgap voltage (for example, approximately 4.8V). Resistors R1 and R2 may be used to bias the gate of the high-voltage cascode transistor T1. The high-voltage cascode transistor T1 may be biased such that the source voltage of the high-voltage cascode transistor T1 is lower than the maximum allowable voltage of the transistors used in the clamp 602 (for example, 3.3V). The resistors R1, R2 and R3 may have a high resistance, and may lower the current consumption of the clamp 602 when the clamp 602 is disabled. The value of the resistors R1 and R2 may be determined using the following equation:

$$I_{V1} = \frac{V_{V1} - 3V_{BE}}{R1 + R2}$$

For example, if the voltage at the V1 port is 5V, and the current is 1 μA, then R1+R2 may be chosen to approximately equal 3 MΩ.

When a separate comparator (not shown) detects that the voltage at the V1 port is above a certain threshold (for example, 5.5V), comparator may enables the sink LDO 604 and disable the clamp 602 by setting the enable/disable signal HIGH. The sink LDO 604 may use a reference voltage (for example, a bandgap voltage of 1.21V) which may then be multiplied with the ratio of resistors R4 and R5 by means of negative feedback. The amplifer A1 may drive transistor T13 which may sink a desired amount of current through the high-voltage cascode transistor T1. The following equation may be used to calculate the voltage at the V1 port when the sink LDO 604 is enabled:

$$V_{V1} = \frac{R4 + R5}{R5} V_{ref}$$

The combination circuit 600 may sink current from the V1 port and may maintain the voltage at the V1 port to within the desired Vmax and Vmin values. The combination circuit 600 may prevent damage to other system components, and may ensure other system components operate properly.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A system for supplying power, comprising:
an input port;
an output port;
a regulator, wherein the regulator receives a voltage at the input port and using the received voltage at the input port supplies power to the output port in a first mode, sinks current from the output port in a second mode when a voltage at the output port exceeds a threshold, and is disabled in a third mode and the regulator is a push/pull low-dropout regulator; and
a clamp, wherein the clamp is disabled in the first and second modes, the voltage at the output port being held by the push/pull-dropout regulator between a minimum voltage and a maximum voltage in the first and second modes, and the clamp is enabled to limit the voltage at the output port below the maximum voltage in the third mode, wherein the enabling of the clamp is caused by a drop in the received voltage at the input port below or equal to a selected voltage.

2. The system for supplying power of claim 1, wherein the regulator limits the voltage at the output port to below the maximum voltage in the second mode.

3. The system for supplying power of claim 1, wherein the regulator includes a source regulator and a sink regulator.

4. The system for supplying power of claim 3, wherein the sink regulator is enabled when the voltage at the output port exceeds a threshold.

5. The system for supplying power of claim 1, wherein the maximum voltage is a voltage that would damage the system.

6. The system for supplying power of claim 1, wherein the regulator and the clamp are integrated in the same component.

7. The system for supplying power of claim 1, wherein the regulator supplies power to a microcontroller.

8. The system for supplying power of claim 7, wherein the microcontroller receives inputs from external switches.

9. The system for supplying power of claim 8, wherein the regulator limits a voltage from the external switches in the second mode, and wherein the clamp limits the voltage from the external switches in the third mode.

10. The system of supplying power of claim 1, wherein in the selected voltage is substantially zero volt.

11. A method for supplying power, comprising:
receiving power at an input port and supplying power to an output port by a regulator in a first mode, wherein the regulator is a push/pull low-dropout regulator;
sinking current from the output port by the regulator in a second mode when a voltage at the input/output port exceeds a threshold, wherein the voltage at the output port is held between a minimum voltage and a maximum voltage in the first and second modes by the push/pull low-dropout regulator;
disabling the regulator in a third mode; and
limiting the voltage at the output port below the maximum voltage by a clamp in the third mode when a voltage of the received power at the input port drops below a selected threshold.

12. The method for supplying power of claim 11, wherein sinking current from the output port by the regulator includes limiting the voltage at the output port to below the maximum voltage in the second mode.

13. The method for supplying power of claim 11, wherein the regulator includes a source regulator and a sink regulator.

14. The method for supplying power of claim 13, further comprising:
enabling the sink regulator when the voltage at the output port exceeds a threshold.

15. The method for supplying power of claim 11, wherein the regulator and the clamp are integrated in the same component.

16. The method for supplying power of claim 11, further comprising:
supplying power to a microcontroller by the regulator.

17. The method for supplying power of claim 16, wherein the microcontroller receives inputs from external switches.

18. The method for supplying power of claim 17, further comprising:
limiting a voltage from the external switches by the regulator in the second mode; and
limiting the voltage from the external switches by the clamp in the third mode.

19. A system for supplying power, comprising:
an input/output port;
a regulator, wherein the regulator supplies power to the input/output port in a first mode, sinks current from the input/output port in a second mode when a voltage at the input/output port exceeds a threshold, and is disabled in a third mode; and
a clamp, wherein the clamp disabled in the first and second modes, the voltage at the input/output port being held between a minimum voltage and a maximum voltage in the first and second modes, and the clamp is enabled to limit the voltage at the input/output port below the maximum voltage in the third mode, wherein the clamp is configured to consume a maximum current when the clamp is disabled.

* * * * *